June 10, 1924.                                                          1,497,530
F. MORTENSEN
METHOD OF MAKING AIR SPACE BETWEEN PLATES
Filed June 3, 1922
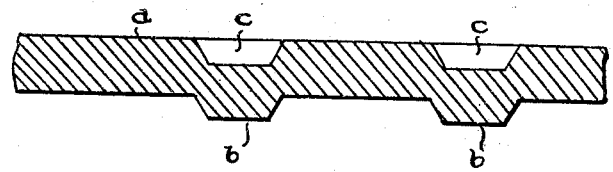
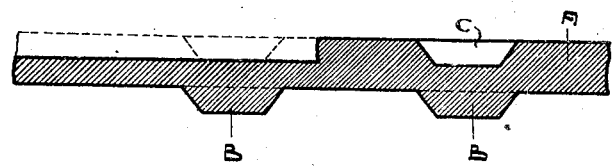
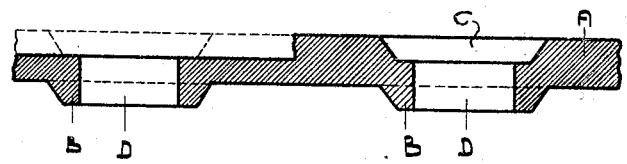
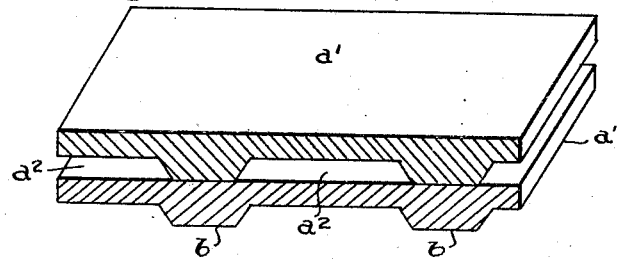
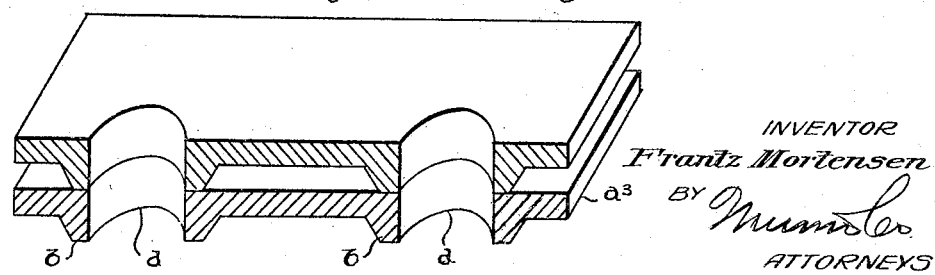
INVENTOR
*Frantz Mortensen*
BY
ATTORNEYS Patented June 10, 1924.

1,497,530

UNITED STATES PATENT OFFICE.

FRANTZ MORTENSEN, OF HELSINGFORS, FINLAND.

METHOD OF MAKING AIR SPACE BETWEEN PLATES.

Application filed June 3, 1922. Serial No. 565,775.

*To all whom it may concern:*

Be it known that I, FRANTZ MORTENSEN, a citizen of the Republic of Finland, and a resident of Helsingfors, Finland, have invented a new and useful Improvement in Methods of Making Air Space Between Plates (for which I have made applications, Germany, January 23, 1922; France, May 9, 1922; England, June 15, 1922; and Denmark, September 9, 1922), of which the following is a full, clear, and exact description.

The invention relates to plates having projections or spacing members thereon, whereby to form spaces between superimposed plates for the circulation of air or liquid therebetween.

Generally pieces of metal have been soldered, riveted or welded to the plates to form spaces between the said plates. Since the plates have to be afterwards tinned or covered with some other material, this way of providing the plates with projections or spacing members, is objectionable, owing to the fact that the plates usually rust adjacent the projections or spacing members.

My invention consists of a method of forming the plates with integral projections or spacing members, so that the plates will present a smooth upper surface, as hereinafter described and pointed out in the claims.

In the accompanying drawing, like reference characters indicate corresponding parts in all of the views.

Figure 1 is a sectional view of a plate formed with depressions in one face and projections on its other face and illustrating the first step of the method, Figure 2 is a similar view of the plate shown in Figure 1 with a portion of its upper face removed and partially illustrating the second step of the method, Figure 3 is a view similar to that of Figure 2 of a modification, Figure 4 is a perspective view of two superimposed finished plates, Figure 5 is a similar view of two superimposed modified form of plates.

Referring to Figures 1, 2 and 4 of the drawing, $a$ is a metal plate, which is of greater thickness than a finished plate and having projections $b$ on one face and depressions $c$ in its other face, the depressions and projections being formed by stamping. As shown in the drawing the depressions are of a depth about equal to one-half of the thickness of the plate, but it is to be understood that the depth of the depressions can vary according to the thickness of the plate and the length of the projection desired.

Having formed the plate with the depressions $c$ and projections $b$, the upper face of the plate $a$ is removed to the depth of the depressions by turning, cutting or grinding. In Figure 2 only a portion of the metal has been removed, but when the metal has been removed from its entire surface, a plate $a'$ with a smooth flat upper face, as shown in Figure 4 is provided. In this figure, two such plates are shown, one upon the other and showing the air or liquid spaces $a^2$ formed between them by the projections or spacing members.

By thus forming the plates, there will be no corrosion of the plates adjacent the projections or spacing members and the plates will have a plain smooth upper surface.

It is sometimes desirable that the plates be provided with openings or passages and in order not to interfere with the air or liquid spaces, I form the openings in the projections or spacing members, as shown in Figures 3 and 5. The openings are preferably formed by drilling or punching after the depressions and projections have been formed in the plate and before the metal has been removed from its upper surface. In Figure 3 is shown a plate having the metal of its upper face partly removed and provided with openings $d$, and in Figure 5 two finished plates $a^3$ provided with openings are shown one upon the other.

What I claim is:—

1. The method herein described of forming a plate with projections on one face, consisting in forming depressions in one face of a plate and projections opposite the depressions on the other face, and removing the material of the face having the depressions to the depth of said depressions to give to the plate a smooth flat face.

2. The method herein described of forming a plate with projections on one face, consisting in forming depressions in one face and projections opposite the depressions on the other face, forming openings in the plate and its projections, and then removing the material of the face having the depressions to the depth of said depressions.

FRANTZ MORTENSEN.